(12) United States Patent
Hudman et al.

(10) Patent No.: US 8,579,443 B2
(45) Date of Patent: Nov. 12, 2013

(54) SCANNED BEAM DISPLAY HAVING A REDIRECTED EXIT CONE USING A DIFFRACTION GRATING

(75) Inventors: Joshua M. Hudman, Sammamish, WA (US); Wyatt O. Davis, Bothell, WA (US); Mark O. Freeman, Snohomish, WA (US); Mark P. Helsel, Seattle, WA (US); David Roy Bowman, Lynnwood, WA (US); Kelly D. Linden, Lynnwood, WA (US)

(73) Assignee: Microvision, Inc., Redmond, WA (US)

( * ) Notice: Subject to any disclaimer, the term of this patent is extended or adjusted under 35 U.S.C. 154(b) by 761 days.

(21) Appl. No.: 12/827,182

(22) Filed: Jun. 30, 2010

(65) Prior Publication Data

US 2012/0001834 A1 Jan. 5, 2012

(51) Int. Cl.
*G03B 21/28* (2006.01)
(52) U.S. Cl.
USPC ............ 353/99; 353/30; 353/31; 353/46; 353/50; 353/85; 348/195; 348/744; 348/746; 359/196.1; 359/199.4
(58) Field of Classification Search
USPC .......... 353/30, 31, 37, 38, 46, 50–51, 85, 94, 353/99, 122; 359/196.1, 199.3, 199.4, 359/202.1, 204.1, 211.6, 212.1, 216.1, 359/217.4, 237, 242, 245; 348/195, 348/744–747, 757, E5.139, E5.142, 348/E9.026; 349/5, 7–9
See application file for complete search history.

(56) References Cited

U.S. PATENT DOCUMENTS

| | | | |
|---|---|---|---|
| 7,220,021 B2 | 5/2007 | Wang et al. | |
| 7,442,918 B2 * | 10/2008 | Sprague et al. | 250/234 |
| 7,628,327 B2 * | 12/2009 | Winkler et al. | 235/454 |
| 2002/0171901 A1 * | 11/2002 | Bernstein | 359/199 |
| 2007/0177250 A1 * | 8/2007 | Duncan | 359/298 |
| 2008/0144150 A1 * | 6/2008 | Champion et al. | 359/199 |
| 2008/0297731 A1 * | 12/2008 | Powell et al. | 353/37 |
| 2010/0046070 A1 * | 2/2010 | Mukawa | 359/480 |
| 2010/0103492 A1 * | 4/2010 | Maruyama et al. | 359/200.6 |

\* cited by examiner

*Primary Examiner* — Sultan Chowdhury
(74) *Attorney, Agent, or Firm* — Kevin D. Wills

(57) ABSTRACT

Briefly, in accordance with one or more embodiments, a scanned beam display, comprises a light source to generate a beam to be scanned and a scanning platform to scan the beam into an exit cone. The scanning platform receives the beam at a selected feed angle, and the scanning platform has a surface structure to redirect the exit cone at an exit angle that is less than the feed angle.

16 Claims, 15 Drawing Sheets

SCANNED BEAM DISPLAY HAVING A REDIRECTED EXIT CONE USING A DIFFRACTION GRATING

BACKGROUND

In scanned beam displays, some designs may involve an integrated photonics module (IPM) having a smaller form factor for utilization of the display in smaller sized, portable devices. However, smaller sized integrated photonics modules tend to restrict the amount of space available for the components of the module including optical components to generate, direct, combine, and scan one or more laser beams. One physical restriction is the Law of Reflection which states that the exit angle of a reflected beam is equal to the angle of incidence. When designing an IPM, the optical components should not be in the path of the exit cone to avoid blocking of the exit cone, which would result in designs having the optical components feeding the beam or beams at some non-zero angle of incidence relative to the normal of the scan mirror. However, the greater the angle of incidence of the feed beam, the greater the exit angle of the feed cone, and a larger physical space may be involved to accommodate the feed beam and the exit cone, thereby making smaller form factors of the integrated photonics module more difficult to realize.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
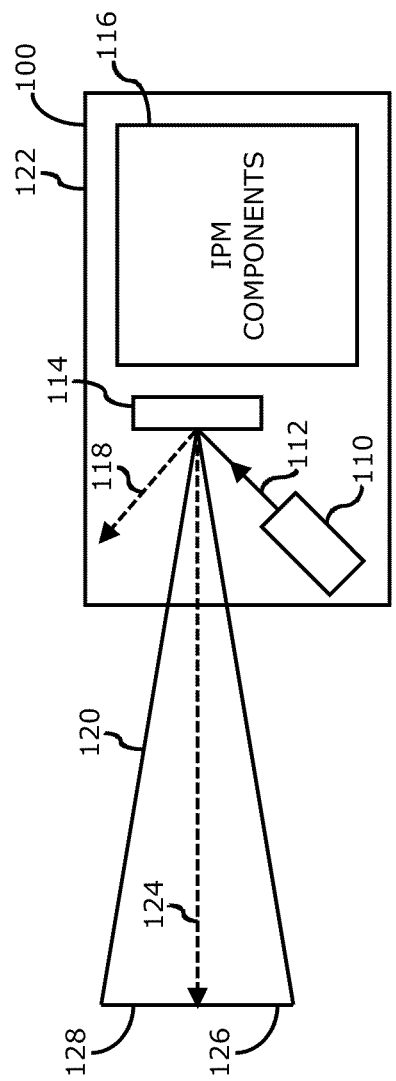
FIG. 1 is a diagram of an integrated photonics module of a scanned beam display having a redirected exit cone in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive- or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an integrated photonics module of a scanned beam display having a redirected exit cone in accordance with one or more embodiments will be discussed. As shown in FIG. 1, an integrated photonics module (IPM) 100 may include a light source 110 capable of generating a beam 112 that impinges on a scanning platform 114 to generate a scanning or raster pattern of a displayed image 126 in an exit cone 120 on a projection surface 128. IPM 100 may further include various other components 116 such as optics and/or circuits housed in a housing 122 or self contained package to be utilized in a scanned beam display. Further details of an example scanned beam display are shown in and described with respect to FIG. 6, below. In one or more embodiments, light source 110 may be positioned in such a manner so as not to obstruct exit cone 120. Such an arrangement may result in the angle of incidence of scanning beam 112 impinging on scanning platform 114 to be relatively high. According to the Law of Reflection, the exit angle of the reflected beam 118 would be equal to the angle of incidence of the incident scanning beam 112. As shown in FIG. 1, the exit angle of the center of the exit cone would normally be coincident with reflected beam 118 at a relatively high exit angle as a result of the high input angle of scanned beam 112. In such an arrangement, the form factor of IPM 100 would be limited by this relatively high exit angle, or the exit cone would otherwise interfere with or be obstructed by the housing 122 in which the IPM is disposed. In accordance with one or more embodiments, the exit cone 120 may be redirected such that the center 124 of the exit cone 120 has an angle that is less than the angle of incidence of scanning beam 112, effectively overcoming the Law of Reflection. Various embodiments for redirecting the exit cone in such a manner are shown in and described with respect to FIG. 2A or FIG. 2B, FIG. 3, FIG. 4, and/or FIG. 5, below.

Figure 2A:
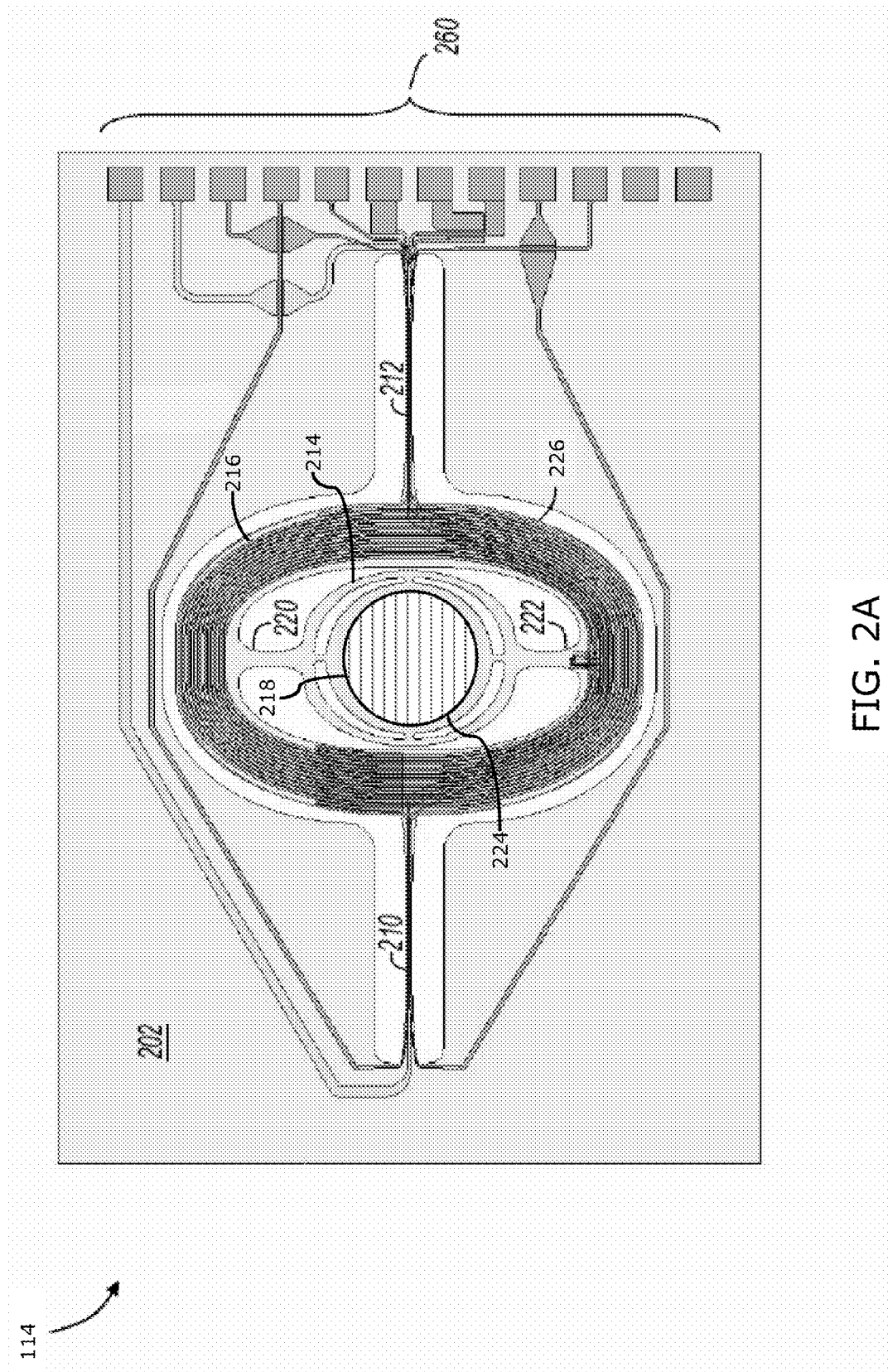
FIG. 2A and FIG. 2B are a diagrams of a scanning platform of a scanned beam display having a structure on the scanning mirror for redirecting the exit cone in accordance with one or more embodiments.
Figure 2B:
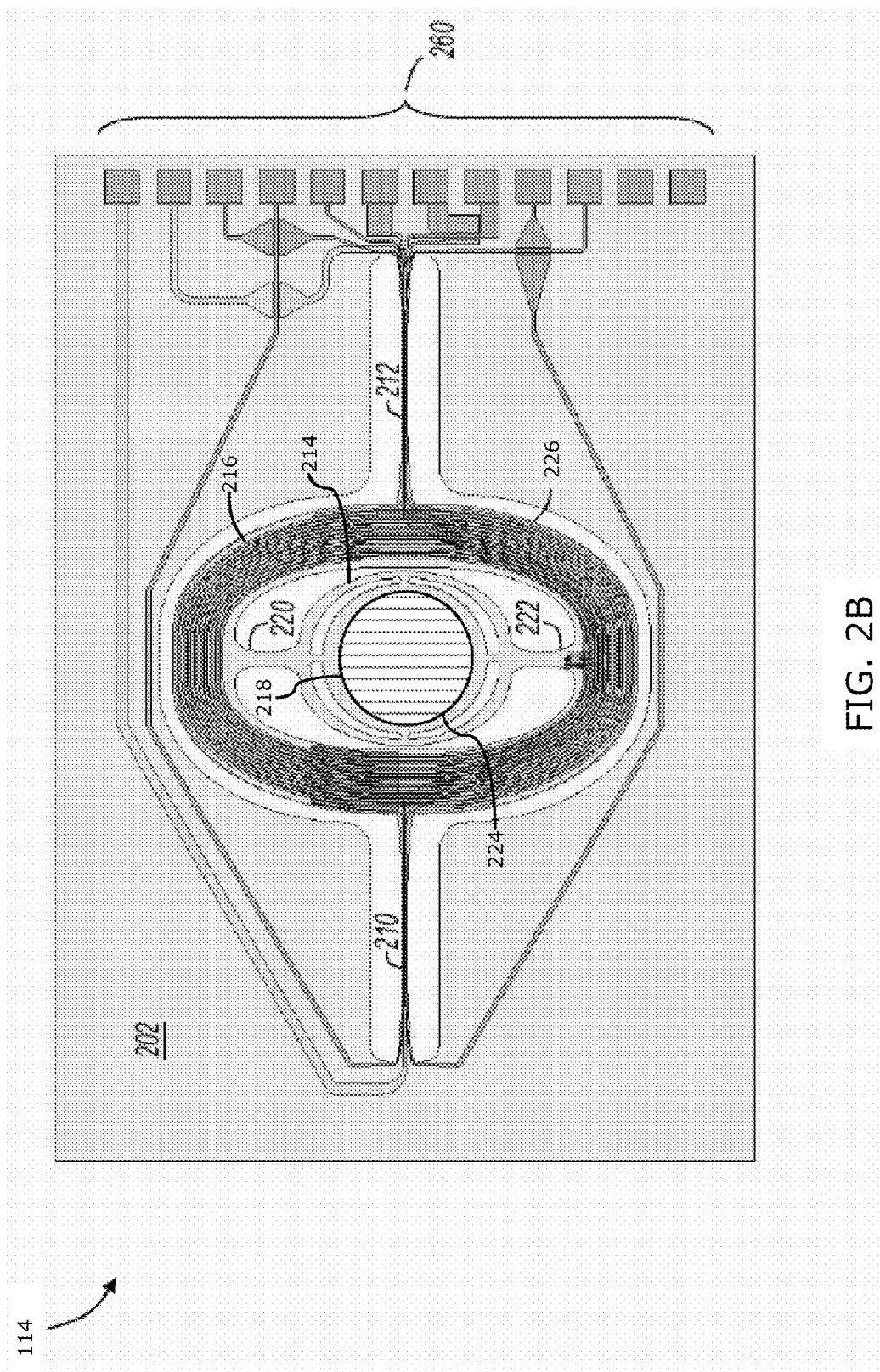

Referring now to FIG. 2A and FIG. 2B, diagrams of a scanning platform of a scanned beam display having a structure on the scanning mirror for redirecting the exit cone in accordance with one or more embodiments will be discussed. In some embodiments, the structure may comprise a non-planar structure or feature such as a faceted mirror, diffraction grating, or a blazed diffraction grating, or alternatively the structure may comprise a planar surface having a normal that is not parallel to one or more axes of rotation of a scanning platform 114, although the scope of the claimed subject matter is not limited in this respect. As shown in FIG. 2A, scanning platform 114 may comprise a substrate 202 such as a silicon substrate or the like comprising the various structures of the scanning platform 114 formed therein. In some embodiments, scanning platform 114 comprises a scanning plate or body 214 suspended by one or more flexures 220 and 222 for motion about a first axis, and/or suspended by flexures 210 and 212 for motion about a second axis. Various contacts 260 couple to one or more field coils 216 and/or 226 that form an electromagnetic field to control the motion of the scanning plate 214 about the first and/or second axes in response to an appropriate drive signal. In one or more embodiments, such as in the example shown in FIG. 2A, scanning platform 114 may comprise a microelectromechanical system (MEMS) device, although the scope of the claimed subject matter is not limited in this respect.

The scanning plate 214 may have a mirror 218 or reflective surface formed thereon to reflect the scanning beam 112 in response to a drive signal to generate a scanning or raster pattern to generate the displayed image 126 on projection surface 128. In some embodiments, scanning platform 114 may comprise a one-dimensional scanner for scanning about one axis. In other embodiments, scanning platform 114 may comprise a two-dimensional scanner for scanning about two axes. As shown in FIG. 2A, mirror 218 may have a structure 224, as indicated by the horizontal lines, that is capable of redirecting the exit cone 120 in a direction that is generally orthogonal to the horizontal lines. In one or more alternative embodiments, as shown in FIG. 2B, the lines of structure 224 may be arranged in a vertical direction to redirect the exit cone 120 in a direction that is generally orthogonal to the vertical lines. In yet further embodiments, the lines of structure 224 may be arranged in any selected direction according to the angle of incidence of scanning beam 112 and the desired direction in which to redirect the exit cone 120. However, these are merely examples of the directions in which exit cone 120 may be redirected, and the scope of the claimed subject matter is not limited in this respect. Examples of various embodiments of the structure 224 of scanning platform 114 to redirect an exit cone are shown in and described with respect to FIG. 3, FIG. 4, and/or FIG. 5, below.

Figure 3:
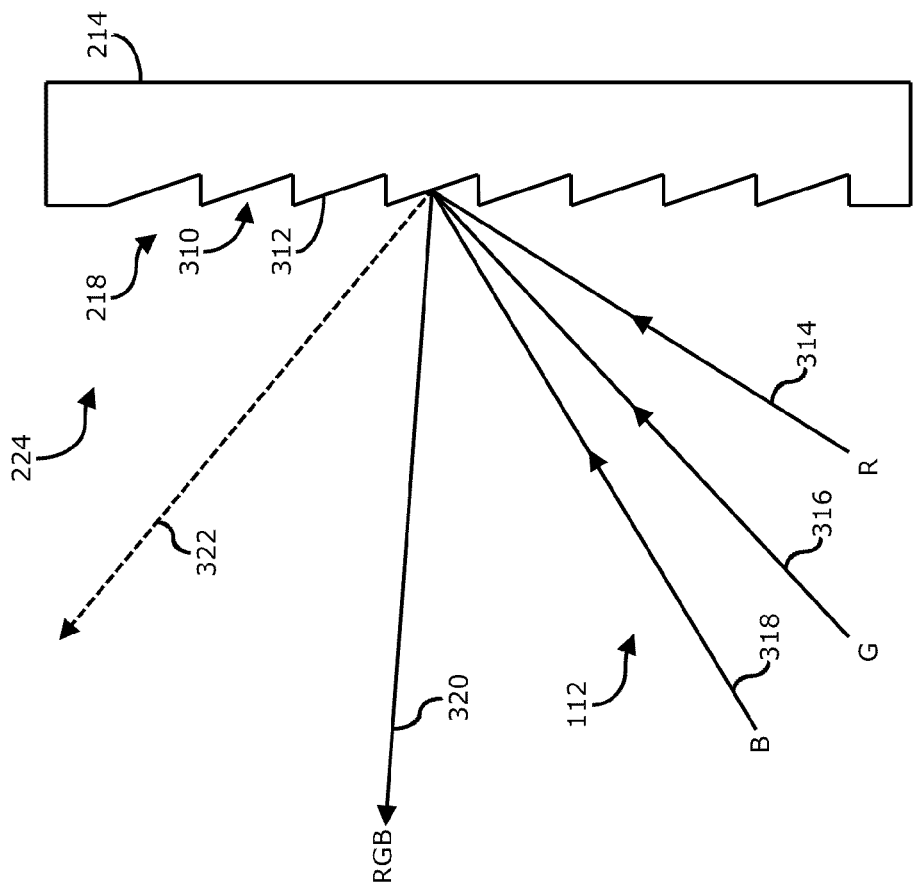
FIG. 3 is a diagram of a scanning mirror of a scanning platform having a diffraction grating formed on the scanning mirror for redirecting the exit cone in accordance with one or more embodiments.

Referring now to FIG. 3, a diagram of a scanning mirror of a scanning platform having a diffraction grating formed on a scanning mirror for redirecting the exit cone in accordance with one or more embodiments will be discussed. As shown in FIG. 3, the scanning plate 214 of scanning platform 114 may comprise a structure 224 formed therein or thereon to redirect the exit angle of exit cone 120. In the embodiment shown in FIG. 3, the structure 224 may comprise a diffraction or blazed grating 310 comprising an array of blazed surfaces 312 formed on or in a surface of the scanning plate 214. As a result, the mirror 218 of scanning plate 214 comprises a blazed grating 310 capable of redirecting the exit angle of the exit cone 120 via diffraction of the one or more beams that comprise the beam 112. In color display, the beam 112 may comprise three colored beams, for example a red beam 314, a green beam 316, and a blue beam 318, for example to generate an RGB output beam 320. Using the green beam 316 as an example, without the blazed grating 310 being formed on scanning plate 214, the exit angle of the scanning beam 112 would be as shown at exit beam 322 according to the Law of Reflection. However, blazed grating 310 may be formed in such a way to redirect the exit angle scanning beam to be less than the angle of incidence, as shown by the exit angle of RGB beam 320. In one or more embodiments, wherein scanning beam 112 multiple colored input beams such as red beam 314, green beam 316, and/or blue beam 318, also may be beam combined by blazed grating 310, for example wherein red beam 314, green beam 316, and/or blue beam 318 do not have identical angles of incidence on scanning plate 214. In such an arrangement, additional beam combining elements may not be needed, although the scope of the claimed subject matter is not limited in this respect.

As an example of a suitable blazed grating 310, the blazed surfaces 312 may be etched directly on the surface of scanning plate 214 using silicon etching and/or other processing techniques so that the blazed surfaces 312 may be arranged to be spaced apart at a pitch of approximately 1.8 micrometers (µm), and a depth of approximately 0.28 micrometers (µm) to provide as selected phase function for red beam 314, green beam 316, and/or blue beam 318. In general, the closer to a true blazed function, the better the diffraction efficiency of the blazed grating 310, for example approximately 98% efficiency at a wavelength of 532 nanometers (nm). Optimization of the diffraction grating 310 may be performed considering a binary phase holographic optical element (HOE) wherein duty cycle and/or etch depth of the blazed surfaces 312 may be adjusted, trading etch depth with duty cycle in an inverse relationship. In some embodiments, diffraction grating 310 may be designed to have a continuous phase such that the efficiency may be approximately 99% at a wavelength of 532 nm. An alternative embodiment of structure 224 to redirect the exit cone 120 is shown in and described with respect to FIG. 4, below.

Figure 4:
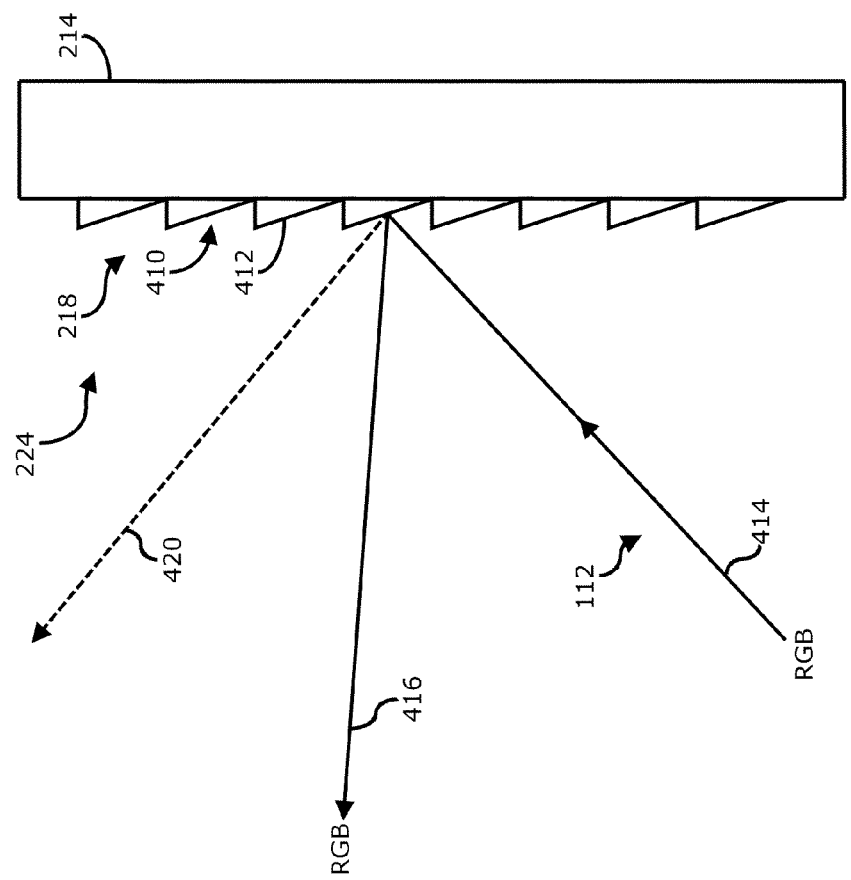
FIG. 4 is a diagram of a scanning mirror of a scanning platform having a faceted mirror formed on the scanning mirror for redirecting the exit cone in accordance with one or more embodiments.

Referring now to FIG. 4, a diagram of a scanning mirror of a scanning platform having a faceted mirror formed on the scanning mirror for redirecting the exit cone in accordance with one or more embodiments will be discussed. As shown in FIG. 4, the structure 224 to redirect the direction of the exit cone 120 may comprise a mirror 218 formed as faceted mirror 410 comprising an array of mirror facets 412 formed on or in a surface of the scanning plate 214. In such an embodiment, beam 112 may comprise a monochromatic beam or a combined multicolor beam such as a red, green, blue (RGB) beam 414. Without the presence of faceted mirror 410 functioning as a structure 224 to redirect the scanning cone 120, the reflected beam 420 will be equal to the angle of incidence of scanning beam 112 as shown in FIG. 4 according to the Law of Reflection. However, faceted mirror 410 may operate to redirect the exit angle of the reflected beam 416 to be less than the angle of incidence of scanning beam 112, to effectively bypass the Law of Reflection for the angle of the exit cone 120. In such an arrangement, the center 124 of exit cone 120 will be generally coincident with the reflected beam 416 as shown based at least in part on the particular arrangement and design of faceted mirror 410.

As an example of a suitable faceted mirror 410, facets 412 may be formed by a composite material molded into a desired structure that may be formed and cured to adhere to a surface of the scanning plate 214 so that the facets 412 may be arranged to be spaced apart at a pitch of approximately 60 micrometers (μm), and a depth of approximately 0.9 micrometers (μm) to provide as selected angle of reflection for the incoming RGB beam 414 as the angle of reflected beam 416. A metallic layer may be deposited on the surface of faceted mirror 410 to provide a scanning mirror 218 of scan plate 214. In some embodiments, faceted mirror 410 may not be subject to diffraction orders and may not result in any change or shift in wavelength as the angle of incidence of scanning beam 112 changes. Another alternative structure for redirecting the exit cone 120 is shown in and described with respect to FIG. 5, below.

Figure 5:
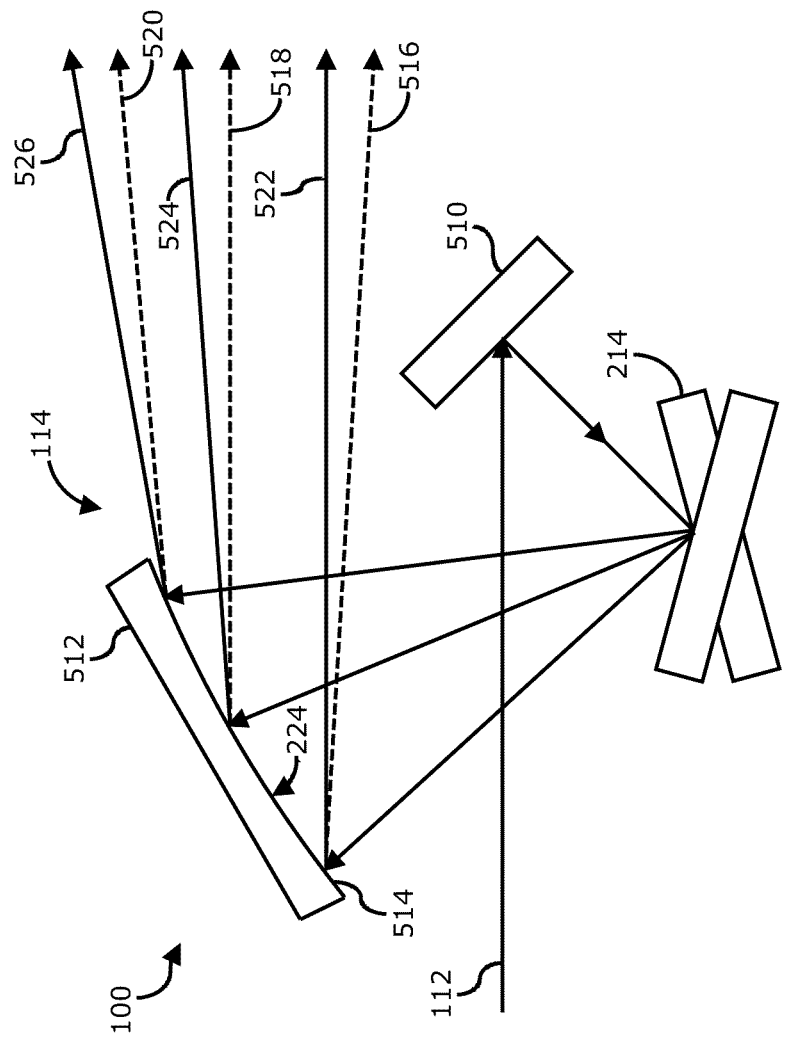
FIG. 5 is diagram of two scanners capable of redirecting an exit cone and further capable of reducing display distortion in a scanned beam display in accordance with one or more embodiments.

Referring now FIG. 5, a diagram of two scanners capable of redirecting an exit cone and further capable of reducing display distortion image in a scanned beam display in accordance with one or more embodiments will be discussed. In the embodiment shown in FIG. 5, integrated photonics module 100 may comprise a scanning platform 114 comprising a first scan plate 214 and a second scan plate 512 in a two MEMS scanner. In general, raster scanning may result in some geometric distortion of the projected image which is inherent in imaging with a rotating scanning mirror. Such distortion may be reduced by providing a structure 224 on a surface 514 of the slower scan plate 512 that is pre-distorted. In one or more embodiments, the structure 224 on the surface 514 of the slower scan plate 512 may be curved, for example wherein structure 224 comprises an at least partially concave surface 514 as shown in FIG. 5, or alternatively wherein structure 224 comprises an at least partially convex surface 514, or combinations thereof. It should be noted that in one or more alternative embodiments, surface 514 need not be convex and may have various other shapes and/or profiles, for example at least partially concave, at least partially toroidal, an at least partial surface sag profile, or an at least partial phase function profile, and so on, and the scope of the claimed subject matter is not limited in this respect. Thus, in one or more embodiments, an incoming scanning beam 112 may impinge on a first mirror 510 or similar reflector to impinge on a first scan plate 214 to scan the beam in a first direction.

For example, in a two dimensional raster scanning display, first scan plate 214 may scan the beam in a horizontal direction at a faster rate than the rate of second scan plate 512. Second scan plate 512 then scans the beam in a vertical direction at a slower rate than the rate of first scan plate 214. Alternatively, the scanning rates and/or vertical and horizontal scanning directions may be reversed for first scan plate 214 and second scan plate 512, and the scope of the claimed subject matter is not limited in these respects. In the absence of structure 224, exit beams 516, 518, and/or 520 may be generated. In the presence of structure 224 of second scan plate 512, structure 224 may cause the exit beams to be redirected to a new angle. For example, exit beam 516 may be redirected to exit beam 522, exit beam 518 may be redirected to exit beam 524, and exit beam 520 may be redirected to exit beam 526. In one or more embodiments, structure 224 may be arranged such that exit cone 120 may be redirected to an angle that is less than the angle of incidence of the scanning beam on surface 514, or alternatively may be redirected to an angle that is greater than the angle of incidence of the scanning beam on surface 514, and the scope of the claimed subject matter is not limited in this respect. In general, since there may be at least some beam walk over the scan angle of scan plate 512, structure 224 may comprise a surface 514 that is predistorted in such a way that alters or otherwise corrects the projected image as a function of scan position of the incident beam on the scan plate 512. In such an arrangement, additional optics to adjust and/or correction the exit beam and/or exit cone may not be required, or may be reduced to do less optical adjusting and/or correcting depending on the particular design and/or form factor of integrated photonics module 100 of a scanned beam display, and the scope of the claimed subject matter is not limited in this respect. A general diagram of a scanned beam display capable of redirecting an exit is shown in and described with respect to FIG. 6, below.

Figure 6:
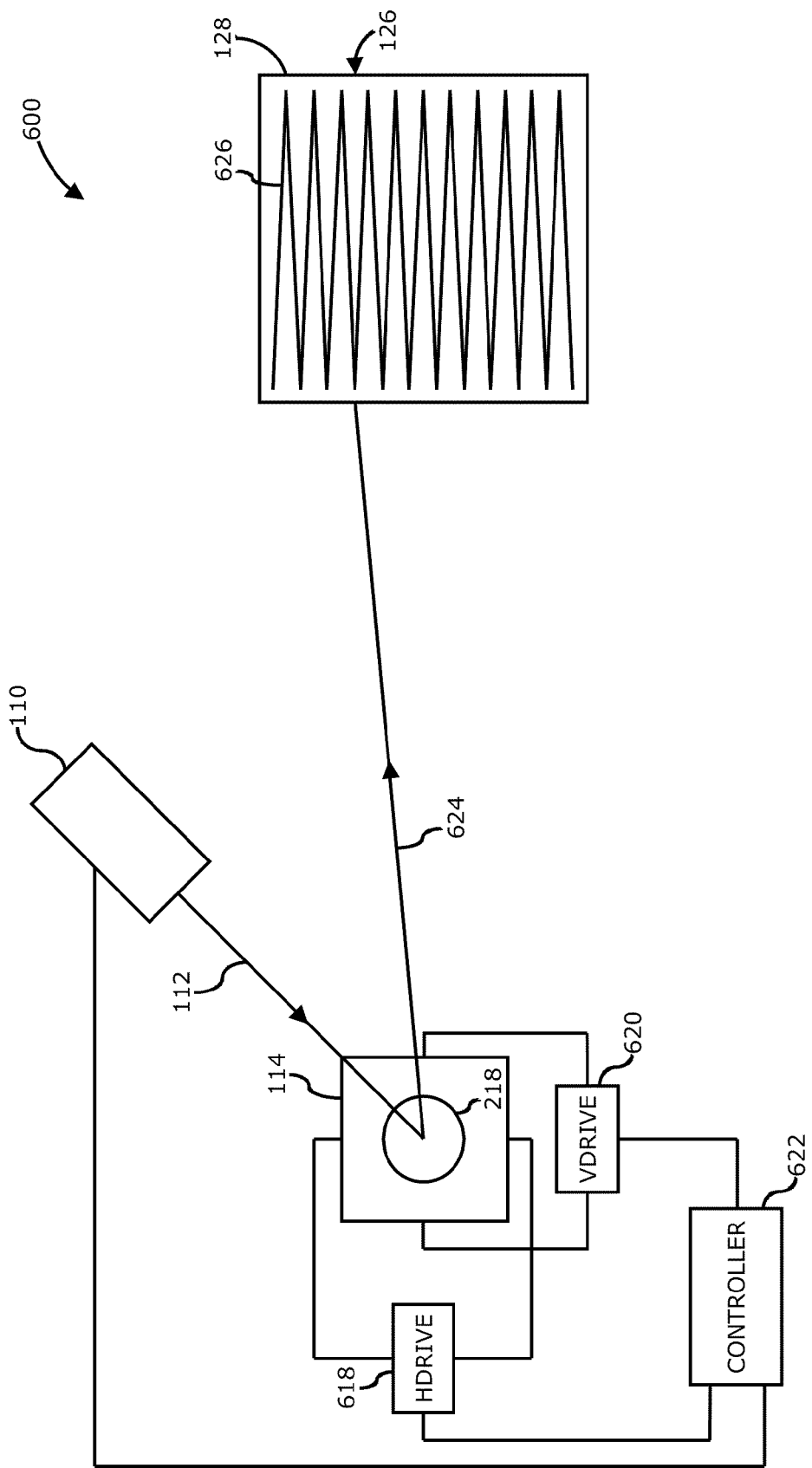
FIG. 6 is a diagram of a scanned beam display capable of redirecting an exit cone in accordance with one or more embodiments.

Referring now to FIG. 6, a diagram of a scanned beam display capable of redirecting an exit cone in accordance with one or more embodiments will be discussed. Although FIG. 6 illustrates one type of a scanned beam display system for purposes of discussion, for example a microelectromechanical system (MEMS) based display, it should be noted that other types of scanning displays including those that use two uniaxial scanners, rotating polygon scanners, or galvonometric scanners as well as systems that use the combination of a one-dimensional spatial light modulator with a single axis scanner as some of many examples, may also utilize the claimed subject matter and the scope of the claimed subject matter is not limited in this respect. Details of operation of scanned beam display are discussed, below.

As shown in FIG. 6, scanned beam display 600 comprises a light source 110, which may be a laser light source such as a laser or the like, capable of emitting a beam 112 which may comprise a laser beam. In some embodiments, light source 110 may comprise two or more light sources, such as in a color system having red, green, and blue light sources, wherein the beams from the light sources may be combined into a single beam 112. In one or more embodiments, light source 110 may include a full color light source such as a red, green, and blue light source, and/or in addition may include an additional light source to emit an invisible beam such as an ultraviolet beam or an infrared beam. The beam 112 is incident on scanning platform 114 which may comprise a microelectromechanical system (MEMS) based scanner or the like in one or more embodiments, and reflects off of scanning mirror 218 to generate a controlled output beam 624. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon device, or other similar scanning or modulating devices. A horizontal drive circuit 618 and/or a vertical drive circuit 620 modulate the direction in which scanning mirror 218 is deflected to cause output beam 624 to generate a raster scan 626, thereby creating a displayed image 126, for example on a display screen and/or image plane 128. A display controller 622 controls horizontal drive circuit 618 and vertical drive circuit 620 by converting pixel information of the displayed image into laser modulation synchronous to the scanning platform 114 to write the image information as a displayed image based upon the position of the output beam 624 in raster pattern 626 and the corresponding intensity and/or color information at the corresponding pixel in the image. Display controller 622 may also control other various functions of scanned beam display 600.

In one or more embodiments, for two dimensional scanning to generate a two dimensional image, a horizontal axis may refer to the horizontal direction of raster scan 626 and the vertical axis may refer to the vertical direction of raster scan 626. Scanning mirror 218 may sweep the output beam 624 horizontally at a relatively higher frequency and also vertically at a relatively lower frequency. The result is a scanned trajectory of laser beam 624 to result in raster scan 626. The fast and slow axes may also be interchanged such that the fast scan is in the vertical direction and the slow scan is in the horizontal direction. However, the scope of the claimed subject matter is not limited in these respects.

In one or more particular embodiments, the scanned beam display 600 as shown in and described with respect to FIG. 6 may comprise a pico-projector developed by Microvision Inc., of Redmond, Wash., USA, referred to as PicoP™. In such embodiments, light source 110 of such a pico-projector may comprise one red, one green, one blue with a lens near the output of the respective lasers that collects the light from the laser and provides a very low numerical aperture (NA) beam at the output. The light from the lasers may then be combined with dichroic elements into a single white beam 112. Using a beam splitter and/or basic fold-mirror optics, the combined beam 112 may be relayed onto biaxial MEMS scanning mirror 116 disposed on scanning platform 114 that scans the output beam 624 in a raster pattern 626. Modulating the lasers synchronously with the position of the scanned output beam 124 may create the projected image. In one or more embodiments the scanned beam display 600, or engine, may comprise a single module known as an Integrated Photonics Module (IPM) such as IPM 100 as shown in and described with respect to FIG. 1, which in some embodiments may be 7 millimeters (mm) in height or less, and in some embodiments maybe less than 5 mm in height, which may be accomplished at least in part via redirection of exit cone 120 as discussed herein. Furthermore, IPM 100 may be less than 5 cubic centimeters (cc) in total volume, although the scope of the claimed subject matter is not limited in these respects. In one or more embodiments, scanned beam display 600 may comprise a standalone device that is capable of generating an image 126 on projection surface in response to a receiving a display signal as an input. In one or more embodiments, scanned beam display 600 may be integrated in or with, or otherwise coupled to, an information handling system as shown in and described with respect to FIG. 12, below. Examples of how a blazed grating 310 and/or a faceted mirror 410 may be manufactured in accordance with one or more embodiments are shown in and discussed with respect to FIG. 7 through FIG. 11, below.

Figure 7:
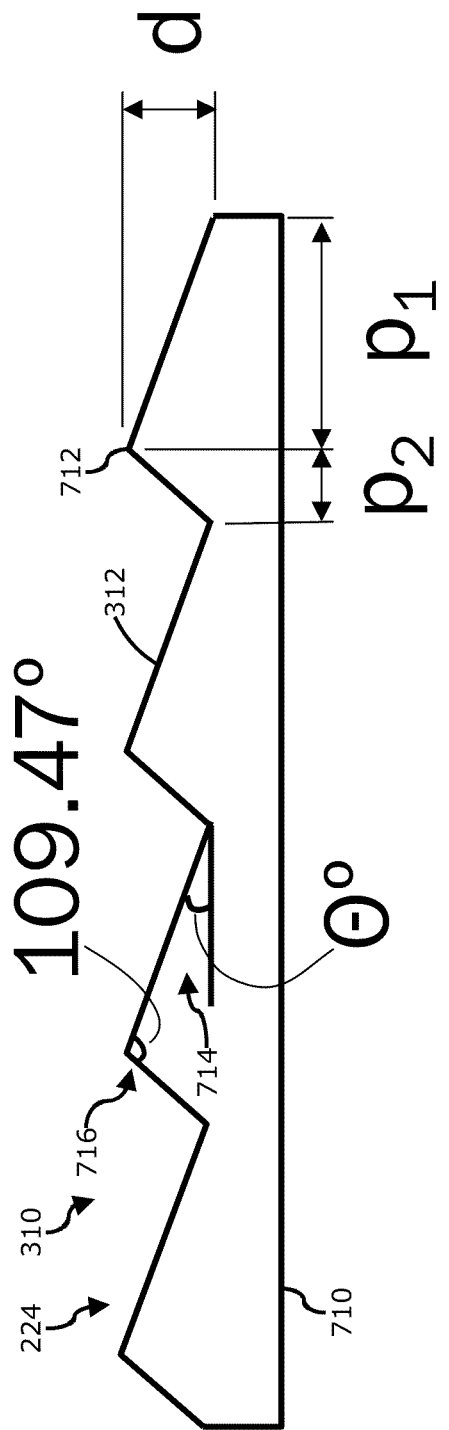
FIG. 7 is a diagram of an example of a blazed grating master etched in silicon in accordance with one or more embodiments.

Referring now to FIG. 7, a diagram of an example blazed grating master etched in silicon in accordance with one or more embodiments will be discussed. In one or more embodiments, a blazed grating 310 or faceted mirror 410 may be fabricated on a scanning platform 114 using an embossing process. In an embossing process, a master mold or stamp may be fabricated having a negative of the structure 224 which may be used to emboss or stamp the desired structure 224 onto the scanning platform 114. Such a master mold or stamp comprise a machine metal stamp, a potassium hydroxide (KOH) etched stamp etched into a silicon substrate, or a secondary molded stamp fabricated from a primary stamp wherein the secondary stamp has the negative of the structure 224 and is used to emboss the structure 224 onto the scanning platform 114. In some embodiments, the desired structure 224 may be laminated onto a surface of scanning platform 114 via a MEMS laminating fabricating process. However, these are merely example techniques for fabricating structure 224 on scanning platform 114 to redirect exit cone 120, and the scope of the claimed subject matter is not limited in these respects.

As shown in FIG. 7, an example master stamp for embossing a structure 224 may comprise a master blazed grating 710 fabricated in a substrate such as silicon, for example via an etching process. The master blazed grating 710 may then be used to emboss the blazed grating 310 onto a surface of a scanning platform as will be discussed in further detail, below. In one or more embodiments, master blazed grating 710 may be fabricated using crystallographic anisotropic etching of a wafer with an off axis cut of the silicon crystal (111) of a silicon wafer. In some embodiments, the etching may comprise a potassium hydroxide (KOH) etching process, although the scope of the claimed subject matter is not limited in this respect. Using such an etching process, master grating 710 may result in structure 224 comprising a blazed grating 310 having multiple saw tooth shaped surfaces 312. As an example, the saw tooth surfaces 312 may a depth, d, of about 0.28 micrometers (μm), a first pitch, $p_1$, of about 1.80 μm, and a second pitch, $p_2$, of about 0.151 μm. In some embodiments, the angle 716 at apex 712 of the saw tooth surface 312 is not 90°, but approximately 109.47° due to the crystalline structure of silicon. The resulting angle, θ, 714 between a horizontal plane of master grating 710 and the larger surface of the saw tooth defined by pitch, $p_1$, is approximately 8.84°, and the tooth width, or period, of a single saw tooth is approximately 1.8 μm. Such a master blazed grating 710 may then be used to print a structure 224 on a scanning platform 114 as shown in and described with respect to FIG. 8, below.

Figure 8A:
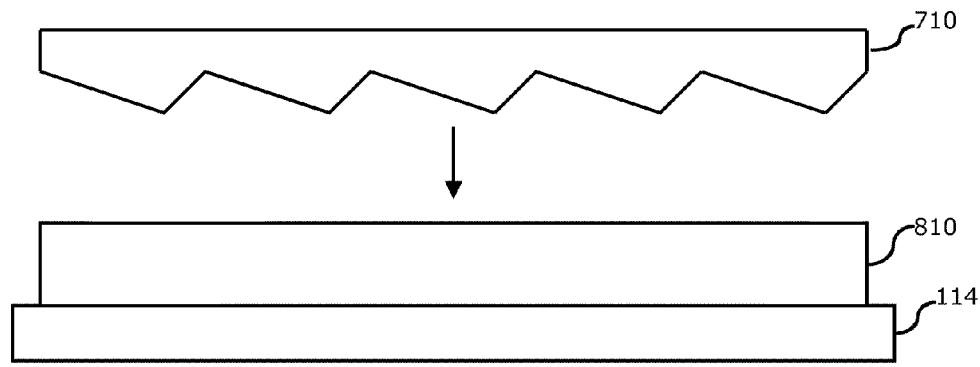
FIGS. 8A-8C are diagrams of a method to imprint a blazed grating into a thermoplastic using a master to make blazed gratings or faceted mirrors in accordance with one or more embodiments.
Figure 8B:
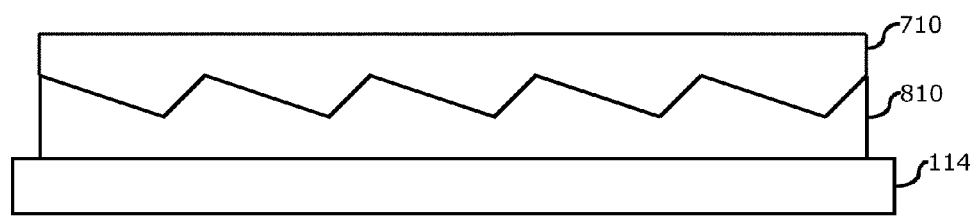
Figure 8C:
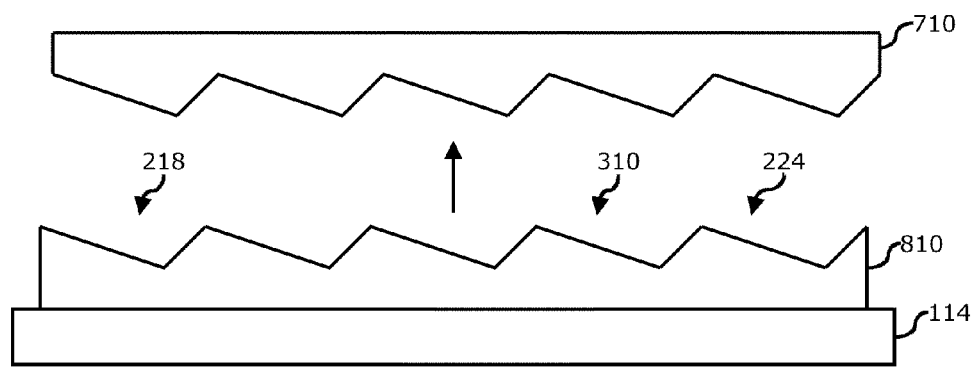

Referring now to FIGS. 8A-8C, diagrams of a method to imprint a blazed grating into a thermoplastic using a master to make blazed gratings or faceted mirrors in accordance with one or more embodiments will be discussed. As shown in FIG. 8A, scanning platform 114 may have suitable material for embossing applied to a surface of the scanning platform 114, for example a thermoplastic 810. In one or more embodiments, thermoplastic 810 may comprise polythermide (PEI), polyethylene terephthalate (APET), polymethylmethacrylate (PMMA), or polycarbonate (PC), or similar material, although the scope of the claimed subject matter is not limited in this respect. Thermoplastic 810 can be applied to the MEMS scanning mirror surface by means of liquid dispensing, liquid spinning or laminating or similar technique, although the scope of the claimed subject matter is not limited in this respect. Under the appropriate conditions, for example temperature and pressure, vacuum, the master blazed grating 710 may be applied to the thermoplastic 810. As shown in FIG. 8B, applying the master blazed grating 710 to thermoplastic 810 will cause thermoplastic 810 to conform to the surface features of the master blazed grating 710. As shown in FIG. 8C, when the master blazed grating 710 is removed, thermoplastic 810 will have the structure 224 of blazed grating 310 formed thereon, and thermoplastic 810 may then be cured as needed to harden the structure 224 into the material. To form scanning mirror 218, thermoplastic 810 may have a reflective material deposit thereon, or alternatively may contain a matrix of reflective particles therein where thermoplastic 810 comprises a material that is sufficiently transparent and/or reflective, although the scope of the claimed subject matter is not limited in this respect. Although FIG. 7 and FIGS. 8A-8C show an example of how blazed grating 310 may be embossed on scanning platform 114, a faceted mirror 410 likewise may be embossed on scanning platform 114 using the same or a similar process, and the scope of the claimed subject matter is not limited in this respect. An example process for embossing a faceted mirror 410 using a secondary master is shown in and described with respect to FIGS. 9A-9D, below.

Figure 9A:
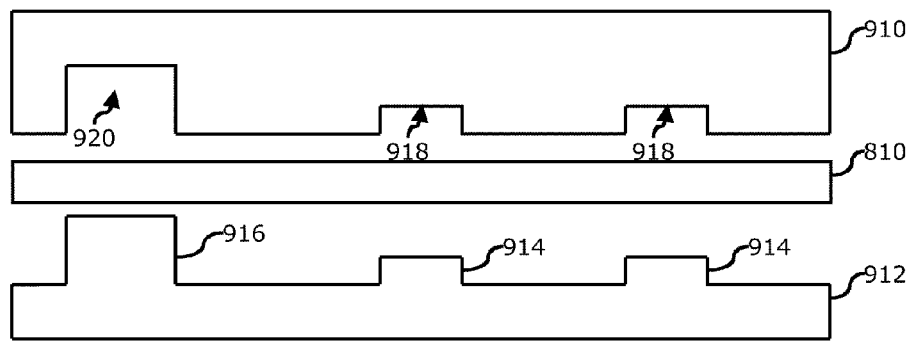
FIGS. 9A-9D are diagrams of a method to emboss a mirror grating to make a secondary master that may be utilized to print other blazed gratings or faceted mirrors in accordance with one or more embodiments.
Figure 9B:
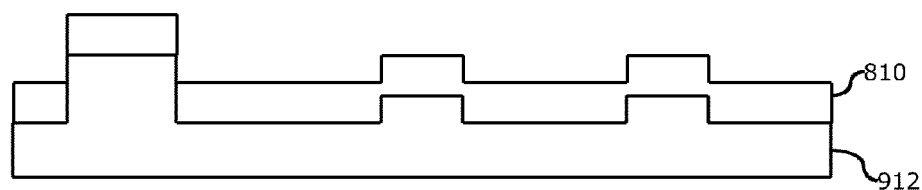
Figure 9C:
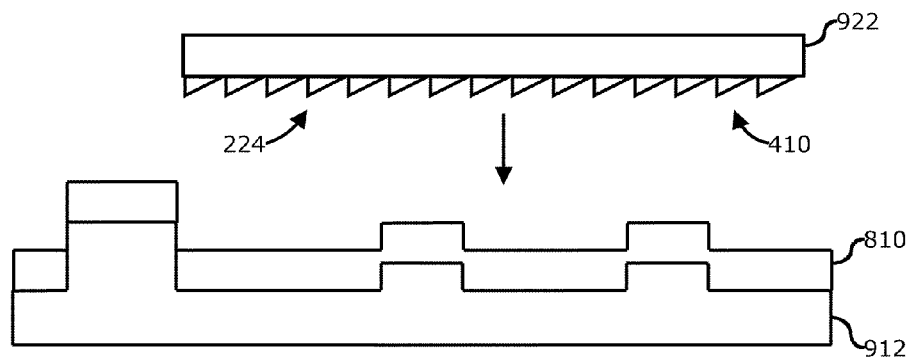
Figure 9D:
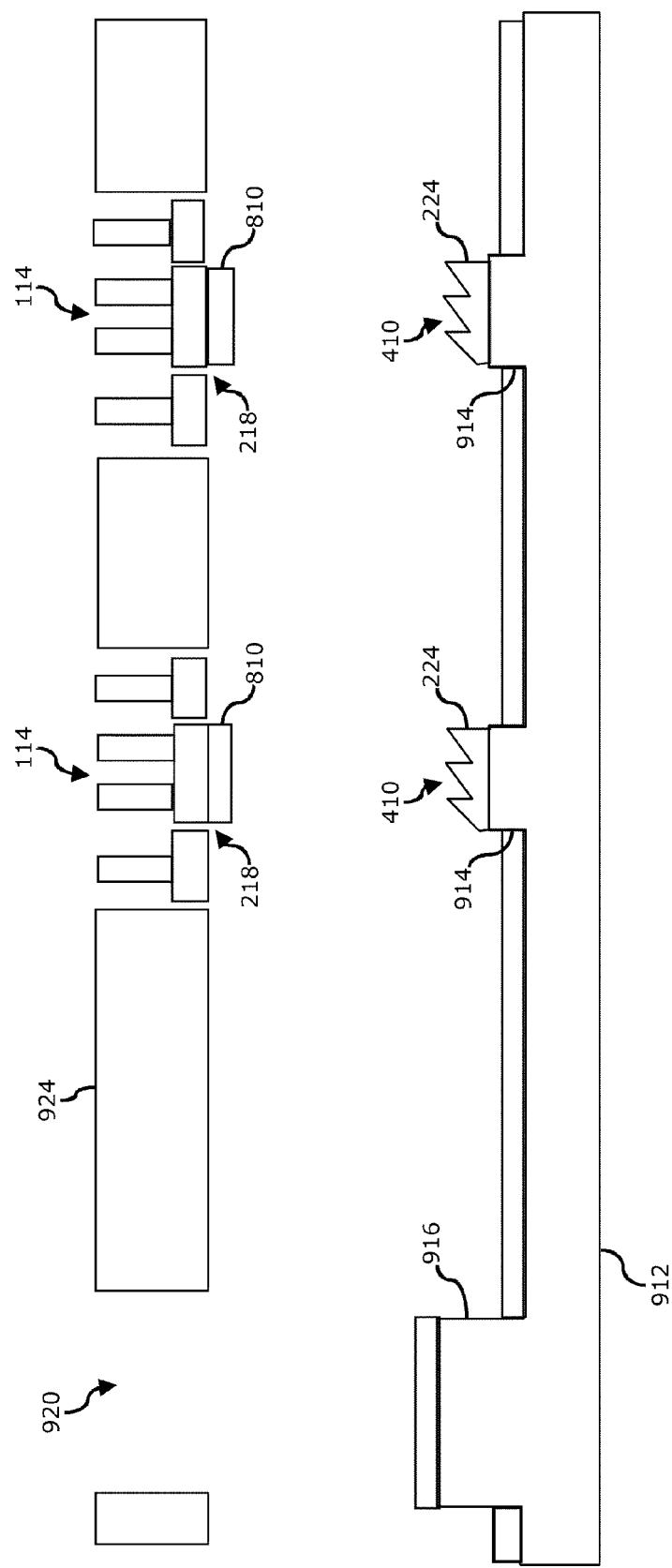

Referring now to FIGS. 9A-9D, diagrams of a method to emboss a mirror grating to make a secondary master that may be utilized to print other blazed gratings or faceted mirrors in accordance with one or more embodiments will be discussed. As shown in FIG. 9A, cavity wafer 910 and a pedestal wafer 912 may be fabricated as complementary wafers, for example using a deep reactive-ion etching (DRIE) anisotropic eth process. In such a process, pedestal wafer 912 may comprise one or more pedestals 914 and an alignment key 916 formed thereon. Cavity wafer 910 may comprise one or more cavities 918 formed therein that are complementary to respective pedestals 914 of pedestal wafer 912. Likewise, an alignment key cavity 920 may be formed in cavity wafer 910 to be complementary to alignment key 916 of pedestal wafer. A thermoplastic 810 may be applied between cavity wafer 910 and pedestal wafer 912 to form the thermoplastic 810 on the surface of pedestal wafer 910 as shown in FIG. 9B when the cavity wafer 910 is subsequently removed. In one or more embodiments, thermoplastic 810 may comprise polyetherimide (PEI) having a glass transition temperature (Tg) of about 210° C. Thermoplastic 810 can be applied to the MEMS scanning mirror surface by means of liquid dispensing, liquid spinning or laminating or similar technique, although the scope of the claimed subject matter is not limited in this respect. Then, as shown in FIG. 9C, a primary wafer mold 922 comprising the structure 224 of a faceted mirror 410. In one or more embodiments, the primary wafer mold 922 may formed from acrylic, silicone such as polydimethylsiloxane (PDMS) or SYLGARD 184 available from Dow Corning Corporation of Midland, Mich., USA, or the like, although the scope of the claimed subject matter is not limited in this respect. The primary wafer mold 922 may be vacuum pressed to the thermoplastic 810 of pedestal wafer 912 to form a secondary master to emboss the faceted mirror 410 onto a scanning platform 114 having a thermoplastic 810 deposited thereon in a manner similar to the process shown in and described with respect to FIGS. 8A-8C, above. As shown in FIG. 9D, pedestal wafer 912 may then have the structure 224 of faceted mirror 410 (or the negative thereof) so that pedestal wafer 912 may be utilized as a secondary master. A scanner wafer 924 may have multiple scanning platforms 114 with a thermoplastic 810 deposited on the surfaces of the mirror plates 218 of the scanning platforms 114. Pedestal wafer 912 is then used to imprint faceted mirror 410 into thermoplastic 810 when the corresponding structures 224 of faceted mirror are brought into contact with the thermoplastic 810, using alignment key cavity 920 and alignment key 916 to align the pedestals 914 with corresponding scanning platforms 114. Although FIGS. 9A-9D show an example of how faceted mirror 410 may be embossed on scanning platform 114, a blazed grating 310 likewise may be embossed on scanning platform 114 using the same or a similar process, and the scope of the claimed subject matter is not limited in this respect. An example method to directly etch a blazed grating 310 on a surface of a scanning platform 114 is shown in and described with respect to FIGS. 10A-10F, below.

Referring now to FIGS. 10A-10F, diagrams of a method to etch a blaze grating via a binary mask process in accordance with one or more embodiments will be discussed. A direct etch process may involve a selective undercut etch in which slot openings may be provided in a mask to pattern a titanium metal. Titanium will etch more quickly than an oxide material and undercut the photo resist to produce a slope in the oxide. For example, the slot openings may be approximately 1 µm in size, and the mask alignment may be offset by an amount of approximately 0.75 µm. The width of the facet may be a function of the metal undercut etch rate, the oxide etch rate, and/or the thickness of the oxide. A titanium buffered oxide etch (BOE) process will quickly etch to undercut the titanium metal produce a slope in the oxide to provide a desired structure such as a surface 312 of a blazed grating 310 or a facet 412 of a faceted mirror 410. A further example of a direct etching process using a titanium metal and a BOE process is shown in FIGS. 10A-10F.

Figure 10A:
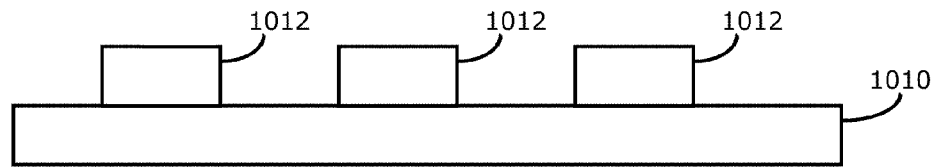
FIGS. 10A-10F are diagrams of a method to etch a blaze grating via a binary mask process in accordance with one or more embodiments.
Figure 10B:
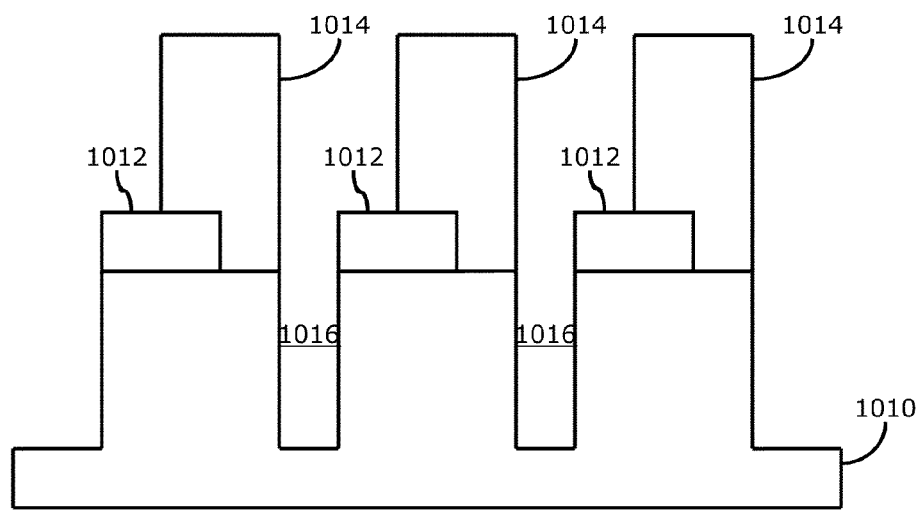
Figure 10C:
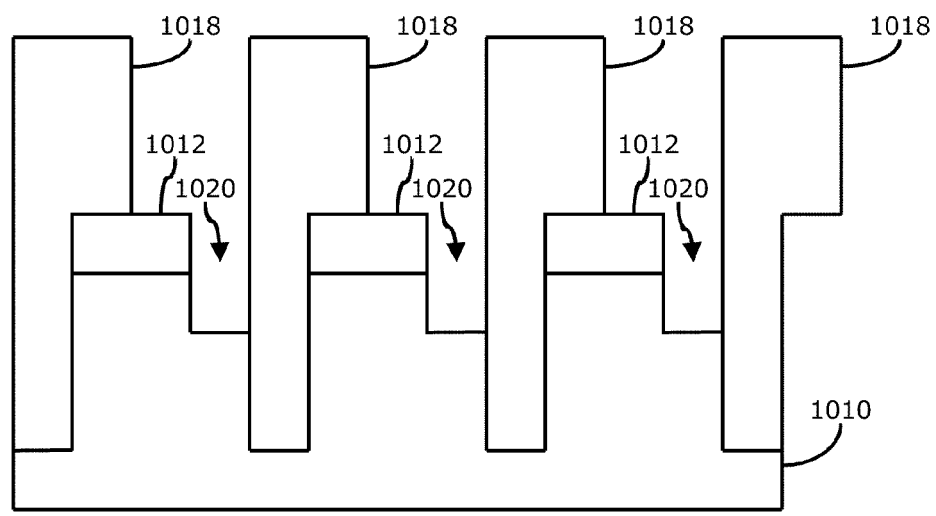
Figure 10D:
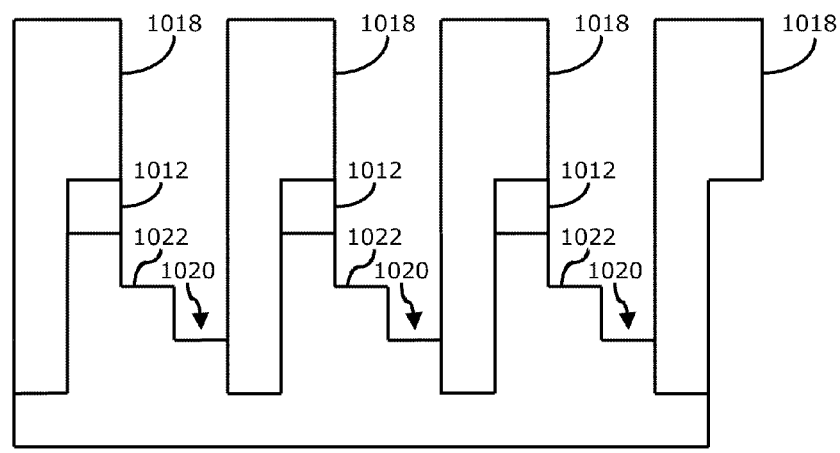
Figure 10E:
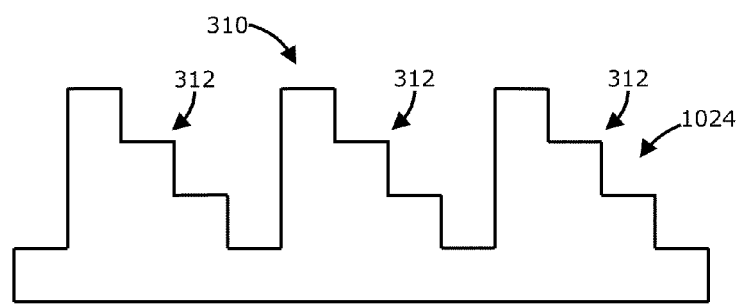
Figure 10F:
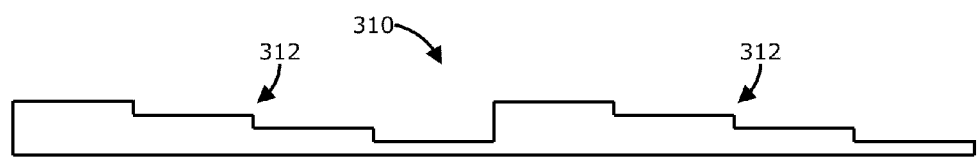

As shown in FIG. 10A, an oxide layer 1010 may have titanium-tungsten (TiW) structures 1012 formed thereon via depositing, masking and etching of a TiW layer. The thickness of the TiW structures 1012 may be approximately 500 Angstroms (Å) and the pitch or spacing of the structures 1012 may be approximately 2.0 micrometers. As shown in FIG. 10B, a resist mask 1014 may be applied to the TiW structures 1012 at an offset of about 0.5 µm from the corresponding TiW structures 1012. A buffered oxide etch (BOE) process may be used to deep etch cavities 1016 into the oxide layer 1010, for example to a depth of about 3× the thickness of the TiW structures 1012, or about 1500 Å. Some minimal lateral oxide etching from the BOE etch may also be performed. As shown in FIG. 10C, another resist mask 1018 may be applied and shifted at an offset of about 0.5 µm from the corresponding TiW structures 1012 in the opposite direction as the previous resist mask 1014 of FIG. 10B. Another BOE etch may be performed to a depth of about 1× the thickness of the TiW structures 1012, or about 500 Å, to etch cavities 1020. As shown at FIG. 10D, the exposed portions of TiW structures 1012 may be etched away, then another BOE etch may be performed at a depth of about 1× the thickness of the TiW structures 1012, or about 500 Å. As a result, cavities 1020 are etched to a depth of about 2×, and cavities 1022 are etched to a depth of about 1×. Next, as shown in FIG. 10E, the resist mask 1018 and the remaining portion of the TiW structures 1012 may be removed to result in a final blazed grating 310 wherein the grating surfaces 312 individually comprise four steps 1024 as shown. In one or more embodiments, the steps 1024 may be approximately 0.5 µm in size using a 1.0 µm wide line or space mask, and the respective grating surfaces 312 may be spaced apart by a distance or pitch of approximately 2.0 µm. In some alternative embodiments, a 1.8 µm pitch of the grating surfaces between sets of steps 1024 may be provided by using a mask with 0.9 µm lines or spaces, and the scope of the claimed subject matter is not limited in this respect. The blazed grating 310 shown in FIG. 10E is shown with different vertical and horizontal scales, whereas the blazed grating 310 is shown in FIG. 10F with the same vertical and horizontal scales. In further alternative embodiments, additional steps 1024 may be provided. For example, blazed grating 310 comprising 8 steps 1024 may be fabricated by adding a second mask with 2 µm lines or spaces to expose and etch every other set of steps. In such an arrangement, the pitch between the 8 steps 1024 would be 4 µm. However, these are merely example of how a blazed grating 310 may be manufacture by etching multiple steps 1024 to form the grating surfaces 312, and the scope of the claimed subject matter is not limited in these respects.

Figure 11:
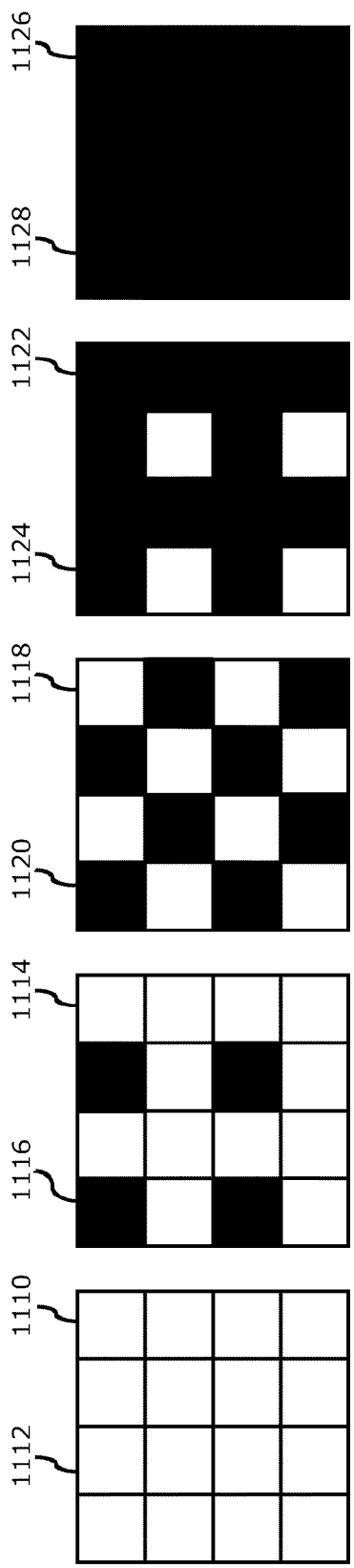
FIG. 11 is a diagram of a method to direct etch a faceted mirror in accordance with one or more embodiments.

Referring now to FIG. 11, a diagram of a method to direct etch a faceted mirror in accordance with one or more embodiments will be discussed. As shown in FIG. 11, a binary gray scale photomask may be made by creating a pixel block 1110 from a 4×4 array of sub-pixels for a total of 16 sub-pixels. The sub-pixels 1112 may be at or near the minimum resolution of the masking tool. For example, for an e-beam tool the sub-pixel size is about 1 μm, although the scope of the claimed subject matter is not limited in this respect. The pixel array may be filled in to define gray scale levels wherein 16 levels are possible for a 4×4 array of sub-pixels. For example, as shown at pixel bock 1110, none of the sub-pixels 1112 are filled in to provide a clear pixel block 1110. Pixel block 1114 may have four sub-pixels 1116 filled in to provide gray scale level of 25%. Pixel block 1118 may have eight sub-pixels filled in to provide a gray scale level of 50%. Pixel block 1122 may have 12 sub-pixels 1124 filled in to provide a gray scale level of 75%. Likewise, pixel block 1126 may have all 16 sub-pixels 1128 filled in to provide a gray scale level or 100% or completely opaque. The gray scale level may be used to vary the light energy passing through the photomask.

In one or more embodiments, a pixel size for a non-reduction print process such as a contact aligner is about 4 μm. The gray scale photo-mask is used to expose photoresist on the mirror surface to create a structure with a graded resist thickness, such as a facet. Some blending of the gray scale level may be provided via proximity printing. A pixel size for a reduction printer, for example a 5:1 stepper, is about 0.8 μm with an effective sub-pixel size of about 0.2 μm. In some embodiments, the sub-pixels may be filled in via a randomized process, although the scope of the claimed subject matter is not limited in this respect. The graded resist thickness is transferred to the mirror substrate by a process such as reactive ion etching (RIE) that will etch the resist and substrate concurrently. The facets of the faceted mirror 410 may be formed as shown in FIG. 11. However, this is merely one method to fabricate a faceted mirror 410, and the scope of the claimed subject matter is not limited in this respect.

Figure 12:
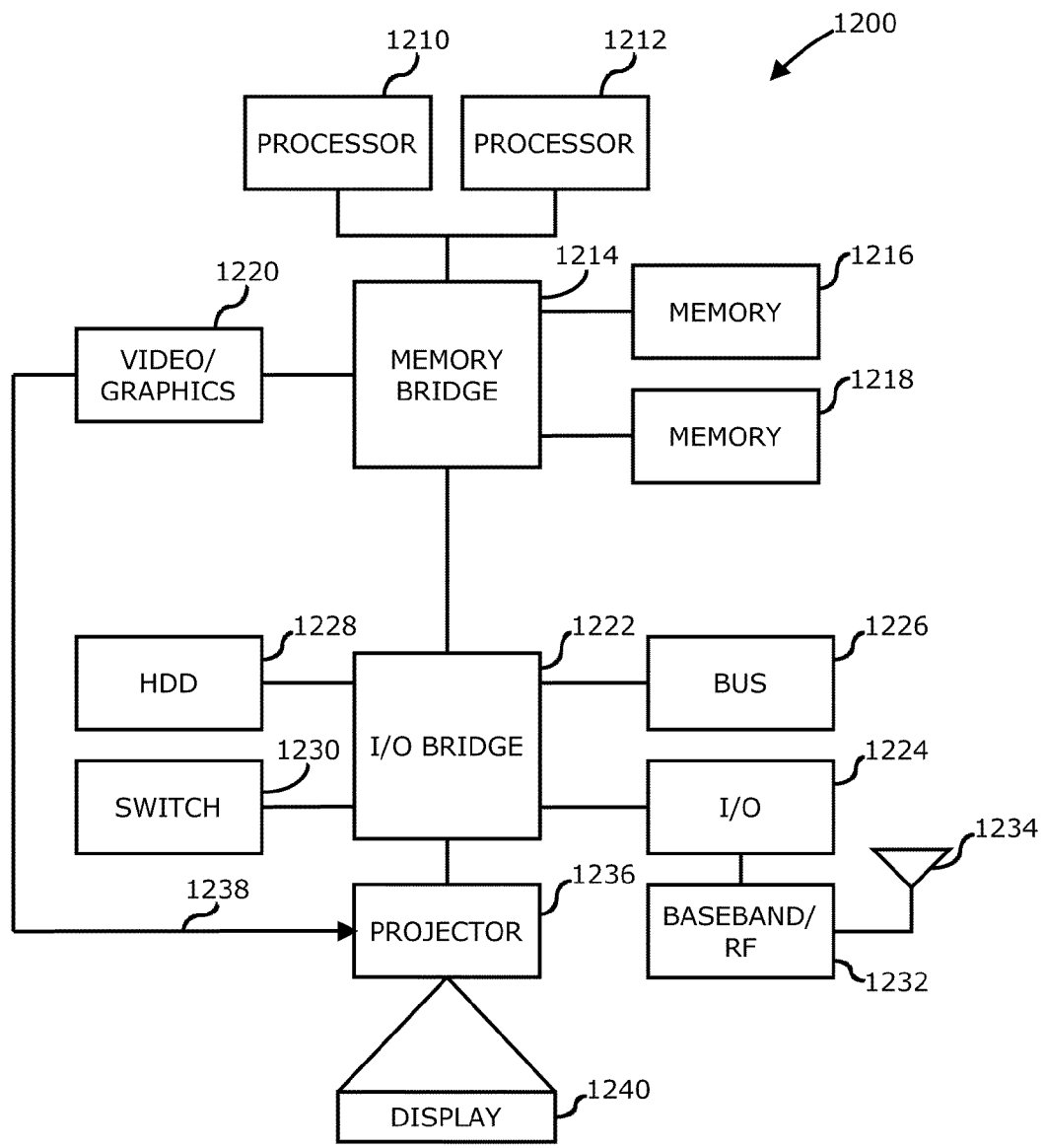
FIG. 12 is a block diagram of an information handling system having a scanned beam display capable of redirecting an exit cone in accordance with one or more embodiments.

Referring now to FIG. 12, a block diagram of an information handling system having a scanned beam display capable of redirecting an exit cone in accordance with one or more embodiments will be discussed. Information handling system 1200 of FIG. 12 may tangibly embody integrated photonics module 100 and/or scanned beam display 600 as shown in and described with respect to FIG. 1 and/or FIG. 6, above. Although information handling system 1200 represents one example of several types of computing platforms, including cell phones, personal digital assistants (PDAs), netbooks, notebooks, internet browsing devices, pads, tablets, and so on, information handling system 1200 may include more or fewer elements and/or different arrangements of the elements than shown in FIG. 12, and the scope of the claimed subject matter is not limited in these respects.

Information handling system 1200 may comprise one or more processors such as processor 1210 and/or processor 1212, which may comprise one or more processing cores. One or more of processor 1210 and/or processor 1212 may couple to one or more memories 1216 and/or 1218 via memory bridge 1214, which may be disposed external to processors 1210 and/or 1212, or alternatively at least partially disposed within one or more of processors 1210 and/or 1212. Memory 1216 and/or memory 1218 may comprise various types of semiconductor based memory, for example volatile type memory and/or non-volatile type memory. Memory bridge 1214 may couple to a video/graphics system 1220 to drive a display device, which may comprise projector 1236, coupled to information handling system 1200. Projector 1236 may comprise integrated photonic module 100 of FIG. 1 and/or scanned beam display 600 of FIG. 6. In one or more embodiments, video/graphics system 1220 may couple to one or more of processors 1210 and/or 1212 and may be disposed on the same core as the processor 1210 and/or 1212, although the scope of the claimed subject matter is not limited in this respect.

Information handling system 1200 may further comprise input/output (I/O) bridge 1222 to couple to various types of I/O systems. I/O system 1224 may comprise, for example, a universal serial bus (USB) type system, an IEEE 1394 type system, or the like, to couple one or more peripheral devices to information handling system 1200. Bus system 1226 may comprise one or more bus systems such as a peripheral component interconnect (PCI) express type bus or the like, to connect one or more peripheral devices to information handling system 1200. A hard disk drive (HDD) controller system 1228 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 730 may be utilized to couple one or more switched devices to I/O bridge 1222, for example Gigabit Ethernet type devices or the like. Furthermore, as shown in FIG. 12, information handling system 1200 may include a baseband and radio-frequency (RF) block 1232 comprising a base band processor and/or RF circuits and devices for wireless communication with other wireless communication devices and/or via wireless networks via antenna 1234, although the scope of the claimed subject matter is not limited in these respects.

In one or more embodiments, information handling system 1200 may include a projector 1236 that may correspond to integrated photonics module 100 of FIG. 1 and/or scanned beam display 600 of FIG. 6, and which may include any one or more or all of the components of integrated photonics module 100 and/or scanned beam display 600 such as controller 622, horizontal drive circuit 618, vertical drive circuit 620, and/or light source 110. In one or more embodiments, projector 1236 may be controlled by one or more of processors 1210 and/or 1212 to implements some or all of the functions of controller 622 of FIG. 6. In one or more embodiments, projector 1236 may comprise a MEMS based scanned laser display for displaying an image projected by projector 1236 wherein the image may likewise be represented by display 1240. In one or more embodiments, information handling system 1200 may comprise video/graphics block 1220 having a video controller to provide video information 1238 to projector 1236 to display an image represented by target/display 1240. In one or more embodiments, projector 1236 may be capable of redirecting exit cone 120 of FIG. 1 as discussed herein. However, these are merely example implementations for projector 1236 of information handling system 1200, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a scanned beam display having a redirected exit cone and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodi-

What is claimed is:

1. A scanned beam display, comprising: a light source to generate a beam to be scanned; and a scanning platform to scan the beam into an exit cone via motion of the scanning platform in response of a drive signal, the scanning platform receiving the beam at an incident angle; wherein the scanning platform has a surface structure to redirect the exit cone at an exit angle that is less than the incident angle; wherein the scanning platform comprises a two-dimensional scanner to scan the beam along first and second axes, wherein a rate of scanning along the first is slower than a rate of scanning along the second axis, and wherein the surface structure redirects the exit cone at an exit angle along the second axis that is less than a component of the incident angle along the second axis.

2. A scanned beam display as claimed in claim 1, wherein the surface structure of the scanning platform comprises a diffraction grating.

3. A scanned beam display as claimed in claim 1, wherein the surface structure of the scanning platform comprises a blazed diffraction grating.

4. A scanned beam display as claimed in claim 1, wherein the surface structure of the scanning platform comprises a faceted mirror.

5. A scanned beam display as claimed in claim 1, wherein the surface structure of the scanning platform comprises a surface that is at least partially convex, concave, toroidal, has a surface sag profile, or has phase function profile, or combinations thereof.

6. A scanned beam display as claimed in claim 1, wherein the scanning platform comprises a microelectromechanical machine system (MEMS) scanner fabricated from silicon.

7. A scanned beam display as claimed in claim 1, wherein the scanning platform comprises a two-dimensional scanner to scan the beam along first and second axes, wherein a rate of scanning along the first is slower than a rate of scanning along the second axis, and wherein the surface structure redirects the exit cone at an exit angle along the first axis that is less than a component of the incident angle along the first axis.

8. A scanned beam display as claimed in claim 1, wherein the beam generated by the light source comprises light that is collimated prior to being incident on the scanning platform.

9. A scanned beam display as claimed in claim 1, wherein the light source comprises multiple light sources to generate multiple light beams having a respective wavelength that is different from the wavelengths of the other light beams, and wherein the surface structure of the scanning platform comprises a diffraction grating capable of beam combining at least two or more of the light beams.

10. A scanned beam display as claimed in claim 1, wherein the light source comprises multiple light sources to generate multiple light beams having a respective wavelength that is different from the wavelengths of the other light beams, and wherein the surface structure of the scanning platform comprises a blazed diffraction grating capable of beam combining at least two or more of the light beams.

11. A scanned beam display as claimed in claim 1, wherein the light beam to be scanned is reflected by the scanning platform in the redirected exit cone, and wherein the exit cone diverges away from a center of the exit cone with increasing distance away from the scanning platform.

12. A scanned beam display as claimed in claim 1, wherein the surface structure of the scanning platform comprises an embossed structure, an etched structure, or a laminated structure, or combinations thereof.

13. A scanned beam display, comprising: a light source to generate a beam to be scanned; a first scanning platform to scan the beam into a first exit cone along a first axis via motion of the first scanning platform in response of a drive signal; and a second scanning platform to scan the first exit cone into a second exit cone along a second axis via motion of the second scanning platform in response to the drive signal, the first exit cone impinging the second scanning platform at an incident angle; and wherein the second scanning platform has a surface structure to redirect the exit cone at an exit angle that is less than the incident angle; wherein the surface structure comprises a diffraction grating.

14. A scanned beam display as claimed in claim 13, wherein the surface structure comprises a curved surface, the curved surface being capable of at least partially reducing distortion in a projected image generated by the first scanner and the second scanner.

15. An information handling system, comprising: a processor and a memory coupled to the processor; and an integrated photonics module coupled to the processor to display an image at least temporarily stored in the memory, wherein the integrated photonics module comprises: a light source to generate a beam to be scanned; and a scanning platform to scan the beam into an exit cone via motion of the scanning platform in response of a drive signal, the scanning platform receiving the beam at an incident angle; wherein the scanning platform has a surface structure to redirect the exit cone at an exit angle that is less than the incident angle; wherein the surface structure comprises a diffraction grating.

16. An information handling system as claimed in claim 15, wherein the surface structure of the scanning platform comprises an embossed structure, an etched structure, or a laminated structure, or combinations thereof.

* * * * *